US006827449B1

(12) United States Patent
Klonis et al.

(10) Patent No.: US 6,827,449 B1
(45) Date of Patent: Dec. 7, 2004

(54) ADHESIVE-SEALED WINDOW LID FOR MICROMECHANICAL DEVICES

(75) Inventors: Homer B. Klonis, Dallas, TX (US); Robert G. McKenna, Houston, TX (US); Ronald A. Jascott, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 405 days.

(21) Appl. No.: 09/222,453

(22) Filed: Dec. 29, 1998

Related U.S. Application Data

(60) Provisional application No. 60/070,152, filed on Dec. 31, 1997.

(51) Int. Cl.[7] ................................ G03B 21/00

(52) U.S. Cl. ................................ 353/31

(58) Field of Search ................................ 349/5, 58, 137; 353/30, 31

(56) References Cited

U.S. PATENT DOCUMENTS 4,812,420 A * 3/1989 Matsuda et al. ............ 437/209
5,058,743 A * 10/1991 Marsh et al. ............... 206/331
5,293,511 A * 3/1994 Poradish et al. ............ 257/434
5,423,119 A * 6/1995 Yang ........................... 29/841
5,508,834 A * 4/1996 Yamada et al. ............... 359/83
5,639,151 A * 6/1997 McNelley et al. ............ 353/98
5,851,366 A * 12/1998 Belscher et al. ....... 204/192.26
5,853,895 A * 12/1998 Lewno .................... 425/425.6
5,878,069 A * 3/1999 Kamibayashi et al. ........ 372/36
5,944,324 A * 8/1999 Schultheis et al. .......... 277/637
5,998,862 A * 12/1999 Yamanaka .................. 257/704

OTHER PUBLICATIONS

Application No. 08/833,166 filed Apr. 4, 1997.

* cited by examiner

*Primary Examiner*—Safet Metjahic
*Assistant Examiner*—Etienne P LeRoux
(74) *Attorney, Agent, or Firm*—Charles A. Brill; Wade James Brady, III; Frederick J. Telecky, Jr.

(57) ABSTRACT

An improved spatial light modulator package comprising a spatial light modulator 1006 attached to a central region of a substrate 1004, a sealing ring 1002 on said substrate 1004 around the central region thereof, a window frame 402 attached to the sealing ring 1002, and a window 404 glued to the window frame 402. Gluing the window 404 to the window frame 402 avoids distortion of the glass that occurs when the window is heat bonded to the window frame, and avoids having to grind and polish the glass window after it is bonded to the window frame.

18 Claims, 4 Drawing Sheets

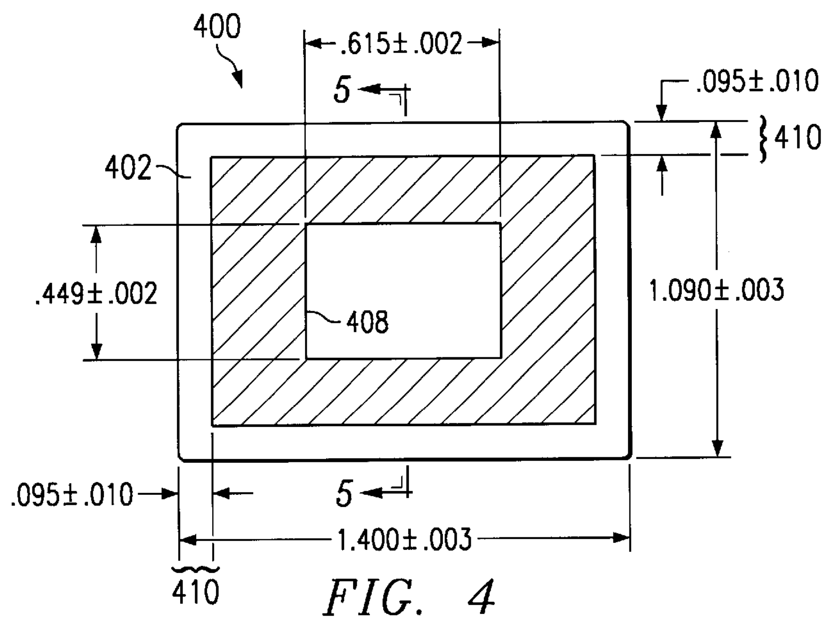
FIG. 4
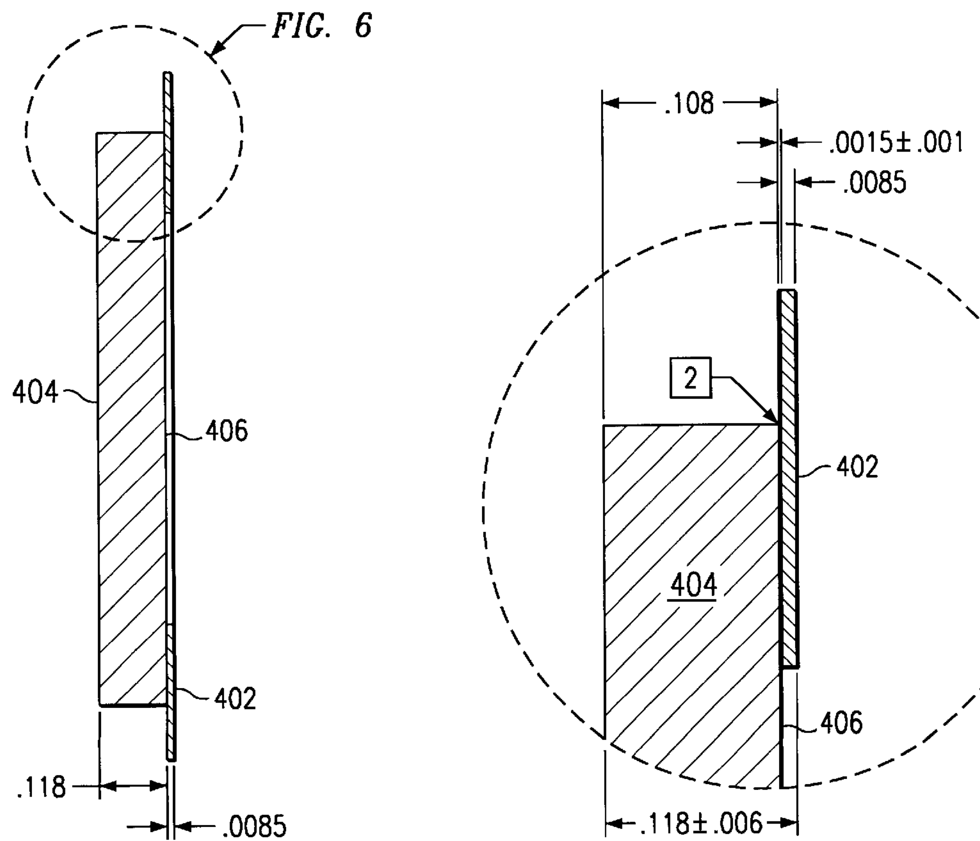
FIG. 5
FIG. 6

ADHESIVE-SEALED WINDOW LID FOR MICROMECHANICAL DEVICES

CROSS-REFERENCE TO RELATED APPLICATIONS

This application claims priority under 35 USC §119(e)(1) of provisional application No. 60/070,152 filed Dec. 31, 1997.

The following patent and/or commonly assigned patent application is hereby incorporated herein by reference:

U.S. Pat. No. 5,610,625 filing date Jun. 7, 1995 issue date Mar. 11, 1997 title Monolithic Spatial Light Modulator and Memory Package.

FIELD OF THE INVENTION

This invention relates to the field of integrated circuit packaging, particularly to light modulator packaging, and more particularly to windows for digital micromirror device packages.

BACKGROUND OF THE INVENTION

Micromechanical devices are small structures typically fabricated on a semiconductor wafer using techniques such as optical lithography, metal sputtering, and plasma etching which have been developed for the fabrication of integrated circuits.

Digital micromirror devices (DMDs), sometimes referred to as deformable micromirror devices, are a particular type of micromechanical devices. Other types of micromechanical devices include accelerometers, pressure and flow sensors, gears and motors. While some micromechanical devices, such as pressure sensors, flow sensors, and DMDs have found commercial success, other types have not yet been commercially viable.

Digital micromirror devices are primarily used in optical display systems. In display systems, the DMD is a light modulator which uses digital image data to modulate a beam of light by selectively reflecting portions of the beam of light to a display screen. While analog modes of operation are possible, DMDs are typically operated in a digital bistable mode of operation and as such are the core of the first true digital full-color image projection systems.

Micromirror devices are used to create image displays by selectively reflecting light from the micromirrors. Micromirror devices are also very sensitive to contamination from outside particles, therefore they must be contained in a sealed environment to protect the micromirror device from the outside particles. Additionally, the micromirror package must have a precisely formed window in the package to allow light to reach the micromirror device and reflect therefrom out of the package.

Micromechanical devices in general, and micromirror device in particular, often require nontraditional packages in order fully to operate to their full potential. These special packages raise the finished cost of the device, and often cost more than the device they package. Perhaps the best example of a micromechanical device that requires special packaging is a micromirror device. Because of the strict optical constraints placed on the package window, prior art windows for micromirror assemblies are very expensive to manufacture. Therefore, an improved low-cost window for a micromechanical device is needed.

SUMMARY OF THE INVENTION

Objects and advantages will be obvious, and will in part appear hereinafter and will be accomplished by the present invention which provides a method and system for an improved windowed package lid. One embodiment of the claimed invention provides a method of packaging a device comprising the steps of providing a ceramic package substrate defining a central region, attaching a metal sealing ring to the ceramic package substrate, bonding the device to the central region of the ceramic package substrate, gluing a window to a window frame, and welding the window frame to the sealing ring.

Another embodiment of the present invention provides a micromechanical package lid. The package lid comprises a glass window and a metal window frame glued to said glass window. Typical package lids also have at least one anti-reflective coating on said glass window. Typical package lids also have a metal aperture deposited on said glass window.

Another embodiment of the disclosed invention provides a device package comprising a substrate having a central region, a sealing ring on the substrate around the central region, a device attached to the central region of the substrate, a window frame attached to the sealing ring, and a window glued to the window frame. The device package has an inner chamber enclosing the device formed by the substrate, sealing ring, window frame, and window.

Yet another embodiment of the disclosed invention provides a projection display system. The projection display system comprises a light source for projecting a beam of light along a light path, a spatial light modulator device in the light path for selectively reflecting portions of the beam of light along the projection light path, and projection optics along said projection light path for focusing said selectively reflected portions of said beam of light onto an image plane.

The spatial light modulator device in the disclosed projection display system is comprised of a micromechanical spatial light modulator packaged within a chamber created by a ceramic substrate, a sealing ring attached to said ceramic substrate, a window frame attached to the sealing ring, and a glass window glued to the sealing ring.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a top view of a window assembly for a micromechanical device package according to one embodiment of the present invention.

FIG. 5 is a cross-sectional view of the window assembly of FIG. 4.

FIG. 6 is a cross-sectional view of one portion of the window assembly of FIG. 4 showing the attachment of a glass window to a metal frame.

DETAILED DESCRIPTION OF THE PREFERRED EMBODIMENTS

Figure 1:
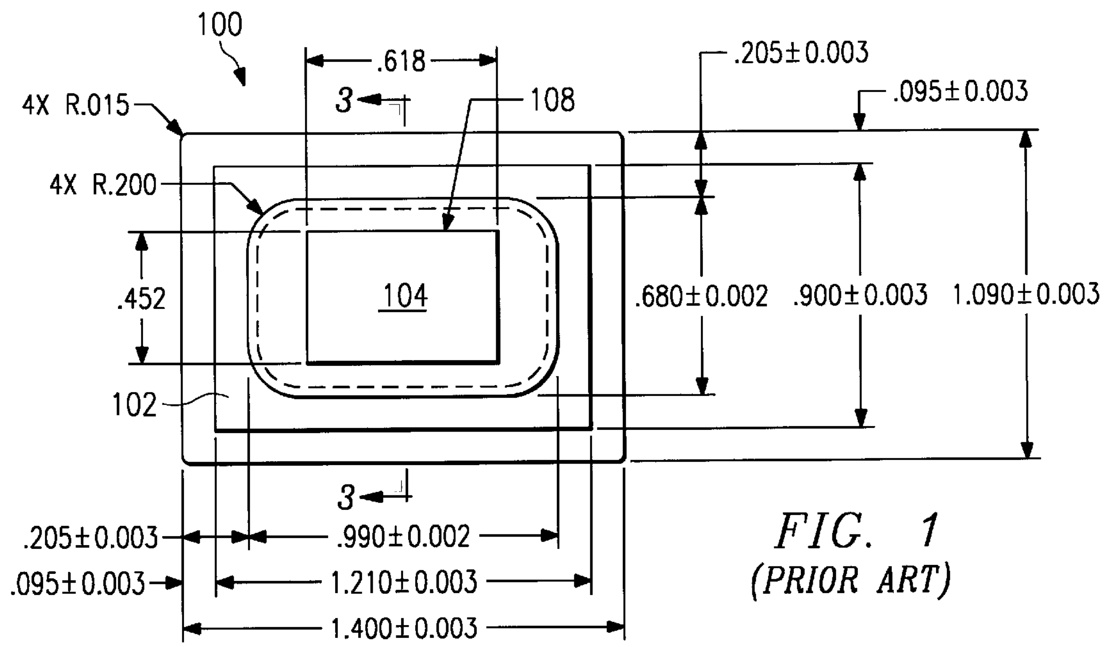
FIG. 1 is a top view of a window assembly for a micromechanical device package according to the prior art.
Figure 2:
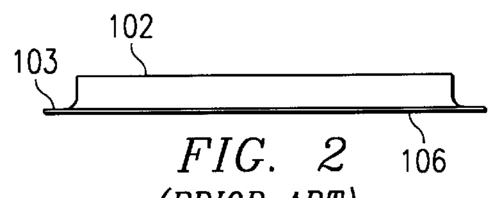
FIG. 2 is a front view of the prior art window assembly of FIG. 1.
Figure 3:
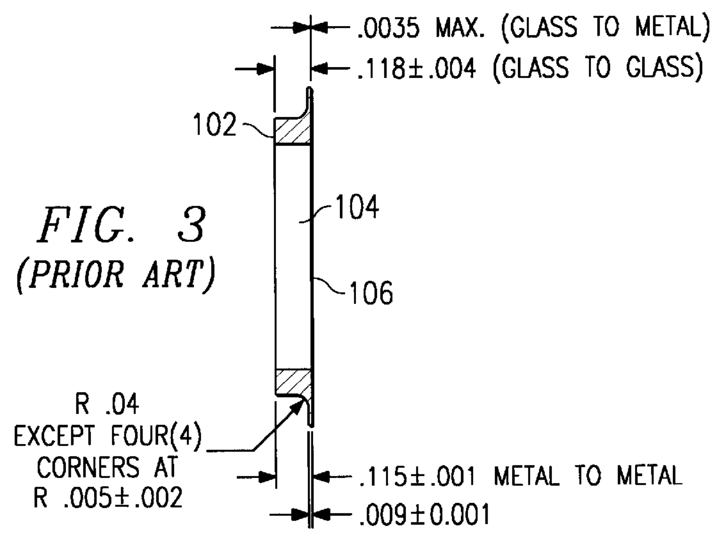
FIG. 3 is a cross-sectional view of the prior art window assembly of FIG. 1.

Prior art windowed package lids, as shown in FIGS. 1–3, require an extensive amount of individual processing which dramatically drives up the cost of producing the package lids. The package lid 100 shown in FIGS. 1–3 is fabricated from a Kovar frame 102 which has been treated to ensure a good glass to metal seal when melted glass is pressed into the frame 102. The frame has a surface roughness of 32 on both sides of a welding flange 103. The frame is nickel plated to a thickness of between 0.0001 and 0.0003 inches and then gold plated to a minimum thickness of 0.00005 inches.

Corning 7056 glass, with a refractive index of 1.487+/−0.010 for light having a wavelength of 0.545 μm is melted and pressed into the frame 102 for form a window. At a temperature of about 800° C., the glass is pressed into the frame 102 to form a window 104. After pressing the glass window 104 into the frame, the window 104 must extend above and below the frame 102 to allow grinding equipment to surface the glass. After the glass window has cooled, it is ground and polished to a surface flatness of four fringes spherical power and two fringes irregularity.

Once both surfaces of the glass window have been ground to the required tolerance, a metal layer is deposited on the inner surface 106 of the glass window 104. The metal layer typically has a reflectance of at least 90% for all wavelengths between 0.42 μm and 0.80 μm. The metal layer is patterned to form an aperture 108. After opening the aperture in the metal layer, both surfaces of the window, including the metal layer, are coated with an antireflective coating. The antireflective coating ensures no more than 0.5% of the light between 0.42 μm and 0.80 μm is reflected by the surfaces of the window 104 and at least 98% of the light between 0.42 μm and 0.80 μm is transmitted. The outer layer of the antireflective coating on the inner surface of the finished lid 106 must be magnesium fluoride. Some versions of the lid only have an antireflective coating on the inner surface, and some versions do not include metal aperture layer.

The new adhesive-sealed lid 400, shown in FIG. 4, dramatically reduces the cost of packaging a micromechanical device. Whereas the lid of the prior art relied upon a glass to metal seal formed at a temperature of 800° C., a process which required each lid window to be individually ground and polished, the lid disclosed herein is fabricated at temperatures below 200° C., allowing the use of float glass sheets. Most of the processing is done to the glass in sheet form, allowing simultaneous processing of 10–20 lids.

According to one embodiment of the present invention, a window frame 402 is formed from a sheet of Kovar or Alloy 42. Since the new lid window design does not rely on a high-temperature glass to metal seal, the window frame 402 may be a flat sheet instead of the thick window frame 102 of prior art package designs. After fabricating the window frame 402 the frame is plated with nickel and, according to some embodiments, gold. According to one embodiment of the disclosed invention, the frame has a surface roughness of 32 on both sides and is nickel plated to a thickness of between 0.0001 and 0.0003 inches and then gold plated to a minimum thickness of 0.00005 inches.

The dimensions of the window frame 402, as well as the dimensions of the window 404, depend on the size of the ceramic substrate to which the window will be attached, as well as other system requirements, such as a preferred glass to device distance. While all the dimensions are understood to depend on the particular application for which the package lid is intended, a typical window frame 402 is 1.090 inches by 1.400 inches, 0.0085 inches thick, and has an opening in the center region that is 0.615 inches by 0.449 inches.

The glass portion of the new lid is preferably fabricated from polished float glass, or an equivalent. A sheet of glass has a metal layer sputtered onto the device side 406 of the glass. The metal layer may be either a highly reflective layer or a non-reflective layer depending on how the optical system tries to control extraneous light. Aluminum, chrome, and silver are useful metals for the metal layer, and are often sputtered over an oxide deposited on the glass to improve adhesion between the glass and the metal layer. The metal layer is then patterned to form a 0.615 by 0.449 inch aperture 408 in the center. After forming the aperture layer, an antireflective coating is fabricated on both sides of the glass, typically having a magnesium fluoride layer as the outer layer on both sides of the glass.

After the antireflective coatings and the aperture metalization are applied to the glass in sheet form, the sheets of glass are scribed and broken into individual windows.

According to various alternative embodiments of the disclosed invention, the metal aperture layer may be sputtered on the glass and patterned after the formation of the antireflective coating. Some applications may only require the antireflective coating to be deposited on one side, probably the device side 406, of the window 404. Additionally, some applications place very restrictive tolerances on the position of the aperture. Extremely tight aperture tolerances require the glass to be scribed and broken to form individual windows prior to the formation of the metal aperture layer.

The window frame 402 and the window 404 are typically epoxied together to form a semi-hermetic seal which is impermeable to many common gasses. The adhesive joint is formed by coating the region of the window frame 402 where the window 404 will be applied with adhesive, preferably in either paste or film form. The completed window 404 is then brought into contact with the window frame 402 and the adhesive is allowed to cure. Since the adhesive cures at a much lower temperature (−25° to +200° C.) than the window forming process of the prior art (+800° C.), there is less stress on the bond allowing the use of material having greater differences in their coefficient of thermal expansion.

Figure 7:
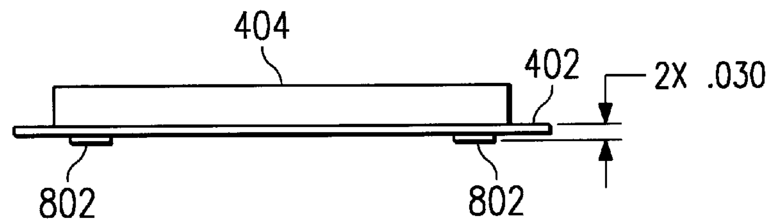
FIG. 7 is a front view of the window assembly of FIG. 4 showing the preferred location of an optional getter.
Figure 8:
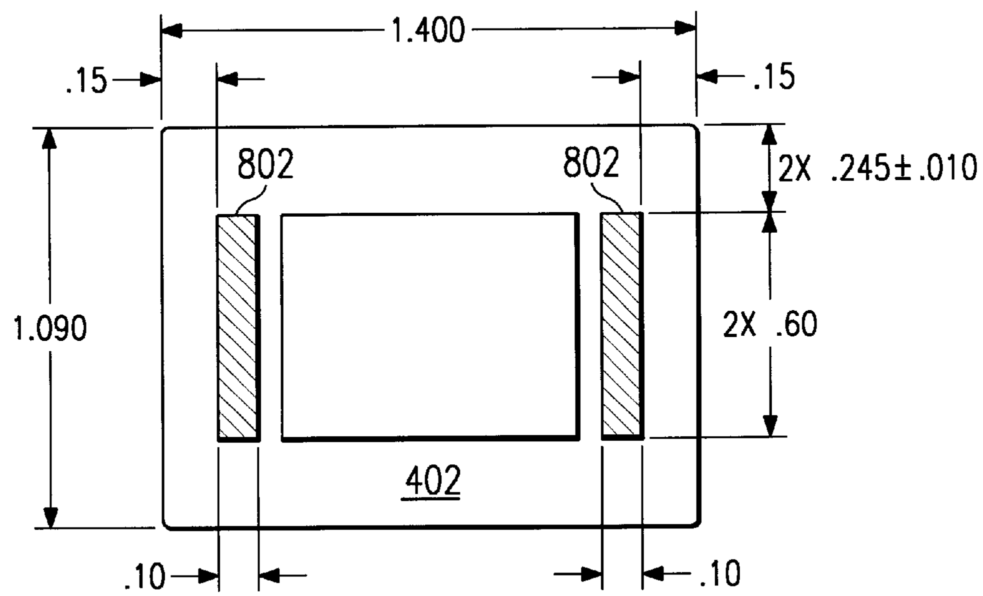
FIG. 8 is a bottom view of the window assembly of FIG. 4 showing the preferred location of an optional getter.

To reduce device failures caused by molecules trapped in the package or generated during device operation, some embodiments of the disclosed invention attach a getter to the inside of the lid. FIGS. 7 and 8 show one location for two getter strips 802 on the inside of the package lid. Getters are chosen from existing getter materials based on the quantity, size, and type of molecules to be trapped. One of the principle functions of the getters is to absorb gasses, particularly water vapor, from the device chamber.

Figure 9:
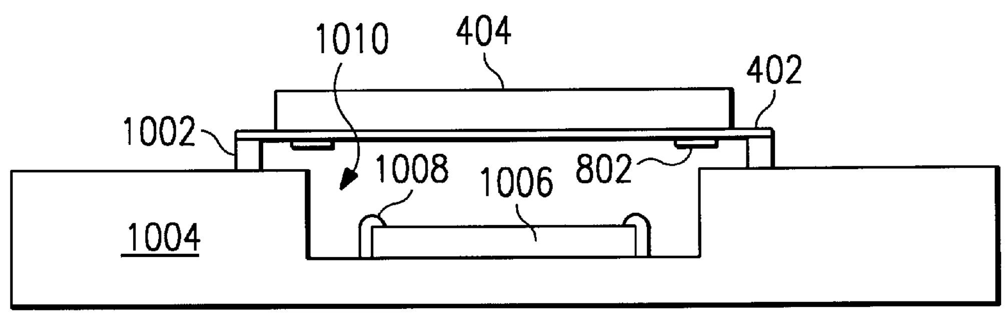
FIG. 9 is a side view of a micromechanical device package showing the attachment of the window lid of FIG. 4 to the remainder of the package.

After the adhesive has cured, the flange of the window frame 402 is seam welded to a metal ring 1002 (shown in FIG. 9) on the ceramic portion 1004 of the device package, completing the packaging of the micromechanical device 1006. To ensure proper access to the flange, an interface zone 410, shown in FIG. 4, is kept clear of the window 404 and adhesive. Prior to attaching the window 404 and frame 402, the micromechanical device 1006, or other device to be packaged, is electrically connected to the substrate by bond-out wires 1008. Bond-out wires 1008 electrically connect the device 1006 to contacts on the exterior of the package through wiring in the ceramic substrate 1004.

Preferably, the completed lid is not seam welded onto the remainder of the package until after the adhesive has fully cured. Welding the lid to the remainder of the package prior to completion of the curing process results in the adhesive outgassing vapors into the package chamber 1010 which are often harmful to the packaged device.

Figure 10:
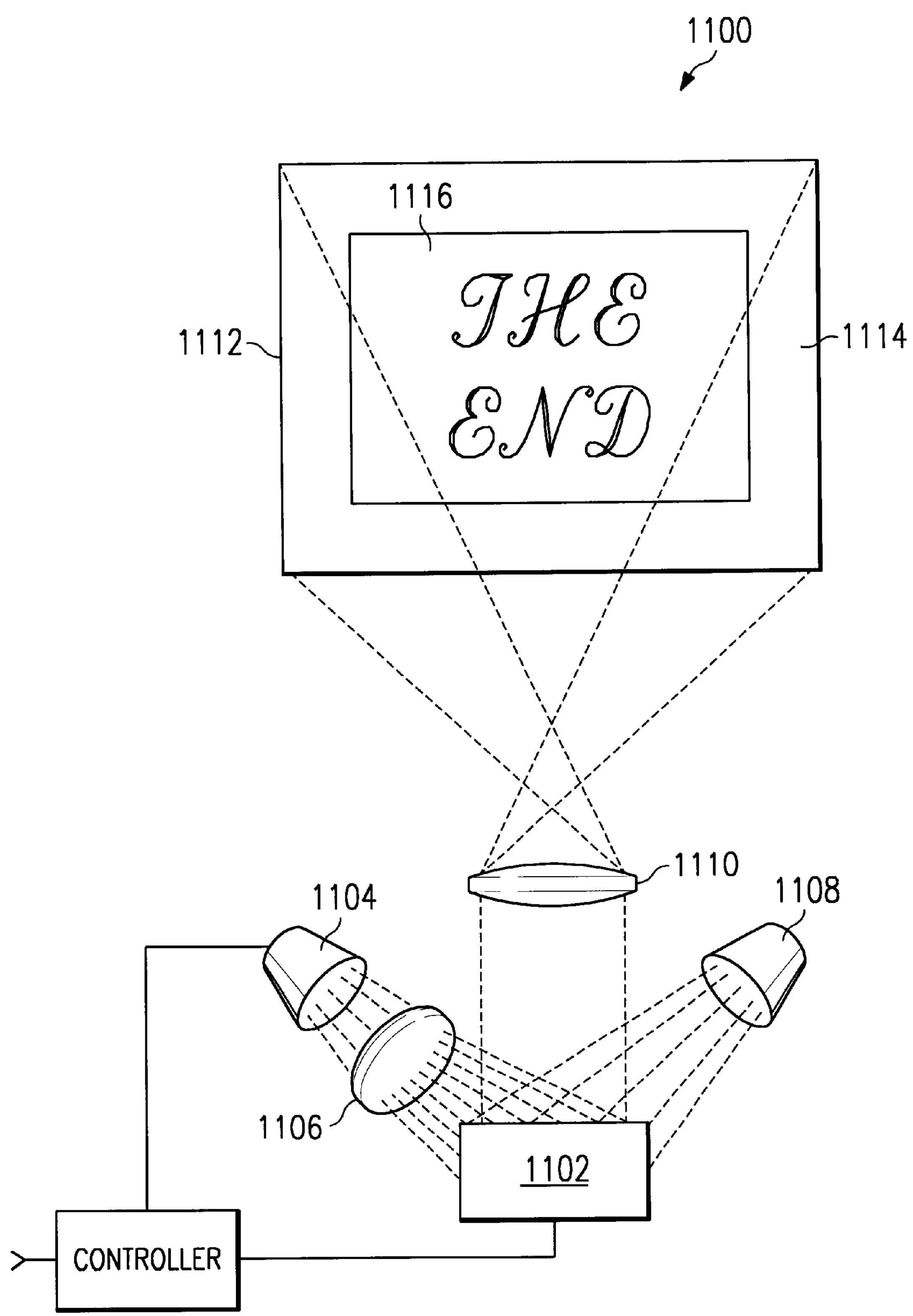
FIG. 10 is a schematic view of a micromirror-based projection system utilizing an adhesive-sealed device package lid according to one embodiment of the present invention.

FIG. 10 is a schematic view of an image projection system 1100 using an improved micromirror package 1102 according to the present invention. In FIG. 10, light from light source 1104 is focused on the improved micromirror package 1102 by lens 1106. Although shown as a single lens, lens 1106 is typically a group of lenses and mirrors which together focus and direct light from the light source 1104 onto the surface of the micromirror device 1102. Mirrors on the micromirror device that are rotated to an off position reflect light to a light trap 1108 while mirrors rotated to an on position reflect light to projection lens 1110, which is shown as a single lens for simplicity. Projection lens 1110 focuses the light modulated by the micromirror device 1102 onto an image plane or screen 1112. Mirrors in the exterior border region of micromirror device 1102 direct the light impinging on the border region to the light trap 1108, ensuring that the border region of the display 1114 is very dark and creating a sharp contrast with the interior image portion 1116 of the image plane.

Thus, although there has been disclosed to this point a particular embodiment for an adhesive-sealed window lid for an integrated circuit package and method therefore etc., it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of packaging a device, said method comprising the steps of:

providing a ceramic package substrate, said ceramic package substrate defining a central region;

attaching a metal sealing ring to said ceramic package substrate;

bonding said device to said central region of said ceramic package substrate;

providing a metal window frame having a first face and an opposing second face;

gluing a window to a central portion of said first face of said window frame, leaving a perimeter portion of said first face extending beyond said window; and welding said perimeter portion of said second face of said window frame to said sealing ring.

2. The method of claim 1, further comprising the step of electrically connecting said device to interconnections in said ceramic substrate.

3. The method of claim 1, further comprising the step of applying an anti-reflective coating to said window.

4. The method of claim 1, said gluing step comprising the step of epoxying said window to said window frame.

5. The method of claim 1, further comprising the step of depositing an aperture on said window.

6. The method of claim 5, wherein said step of depositing an aperture on said window comprises the steps of:

depositing a metal layer on said window; and patterning said metal layer to form said aperture.

7. The method of claim 6, wherein said step of depositing a metal layer comprises the step of depositing a metal selected from the group consisting of aluminum, chrome, and silver.

8. The method of claim 5, wherein said step of depositing an aperture on said window comprises the steps of:

depositing an oxide layer on said window;

depositing a metal layer on said oxide layer; and patterning said metal layer to form said aperture.

9. The method of claim 8, wherein said step of depositing a metal layer comprises the step of depositing a metal selected from the group consisting of aluminum, chrome, and silver.

10. A micromechanical package lid comprising:

a flat metal window frame having opposing first and second faces; and a glass window glued to a central region of said first face of said metal window frame leaving a perimeter of said metal window frame extending beyond said glass window, said second face of said perimeter suitable for attaching said micromechanical package lid to a micromechanical package.

11. The micromechanical package lid of claim 10, further comprising at least one anti-reflective coating on said glass window.

12. The micromechanical package lid of claim 10, further comprising a metal aperture deposited on said glass window.

13. The micromechanical package lid of claim 12, said metal aperture comprised of a metal selected from the group consisting of aluminum, chrome, and silver.

14. The micromechanical package lid of claim 12, said metal aperture comprised of a metal layer deposited on an oxide layer on said glass window.

15. A device package comprising:

a substrate having a central region;

a sealing ring on said substrate around said central region;

a device attached to said central region of said substrate;

a window frame having a first face attached to said sealing ring by a perimeter portion of said window frame extending beyond a central region and a second face opposing said first face; and a window glued to said central portion of said second face of said window frame, said substrate, said sealing ring, said window frame, and said window forming a chamber enclosing said device.

16. The device package of claim 15, further comprising a getter inside said chamber.

17. The device package of claim 15, wherein said device is electrically connected to contacts on the surface of said substrate outside said chamber via interconnections within said substrate.

18. A projection display system comprising:

a light source for projecting a beam of light along a light path;

a spatial light modulator device in said light path, said spatial light modulator device comprised of a micromechanical spatial light modulator packaged within a chamber created by a ceramic substrate, a scaling ring attached to said ceramic substrate, a window frame having a first face welded to said sealing ring, and a glass window glued to a central portion of a second face of said window frame opposing said first face, leaving a perimeter portion of said window frame extending beyond said glass window to allow said window frame to be welded to said sealing ring, said spatial light modulator for selectively reflecting portions of said beam of light along a projection light path;

projection optics along said projection light path for focusing said selectively reflected portions of said beam of light onto an image plane.

* * * * *